United States Patent

Assow

[11] Patent Number: 6,166,924
[45] Date of Patent: *Dec. 26, 2000

[54] DEVICE AND METHOD OF SUPPLYING ENERGY FROM AN AC SOURCE IN AN AC TO DC CONVERTER

[75] Inventor: Bengt Assow, Norsborg, Sweden

[73] Assignee: Telefonaktiebolaget LM Ericsson, Stockholm, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 09/066,412

[22] PCT Filed: Nov. 1, 1996

[86] PCT No.: PCT/SE96/01407

§ 371 Date: May 4, 1998

§ 102(e) Date: May 4, 1998

[87] PCT Pub. No.: WO97/16884

PCT Pub. Date: May 9, 1997

[30] Foreign Application Priority Data

Nov. 3, 1995 [SE] Sweden .................................. 9503885

[51] Int. Cl.$^7$ ........................... H02M 3/335; G05T 1/613
[52] U.S. Cl. .............................. 363/20; 363/124; 363/21; 323/222
[58] Field of Search ................................ 363/37, 20, 21, 363/44, 47, 124; 323/218, 222, 224

[56] References Cited

U.S. PATENT DOCUMENTS

| | | |
|---|---|---|
| 5,103,139 | 4/1992 | Nilssen . |
| 5,119,283 | 6/1992 | Steigerwald et al. ..................... 363/37 |
| 5,130,610 | 7/1992 | Kakitani . |
| 5,258,692 | 11/1993 | Jones . |
| 5,301,095 | 4/1994 | Teramoto et al. ......................... 363/21 |
| 5,331,534 | 7/1994 | Suzuki et al. ............................. 363/20 |
| 5,383,109 | 1/1995 | Maksimovic ............................ 323/222 |
| 5,406,471 | 4/1995 | Yamanaka ............................... 363/124 |

FOREIGN PATENT DOCUMENTS

| | | |
|---|---|---|
| 4243943A1 | 7/1993 | Germany . |
| 63-89068 | 4/1988 | Japan . |

OTHER PUBLICATIONS

"A New Family of Single–Stage Isolated Power–Factor Correctors with Fast Regulation of the Output Voltage," by R. Redl, et al., PESC 94, Record, 1994, pp. 1137–1144.

Primary Examiner—Peter S. Wong
Assistant Examiner—Rajnikant B. Patel
Attorney, Agent, or Firm—Burns, Doane, Swecker & Mathis, L.L.P.

[57] ABSTRACT

In an arrangement for supplying energy from an a.c. voltage source that includes a rectifier bridge (D1) and a converter (TR1, D5, C4), an inductor means (L1) is connected between a first output terminal on the rectifier bridge and a valley-fill circuit (10) that includes at least two capacitors (C1, C2). The converter includes a transformer (TR1) having a primary winding which together with a controllable switch means (SW1) is included in a loop that extends from a second output terminal on the rectifier bridge to the interconnection junction between the inductor means and the valley-fill circuit (10). When the absolute value of the source voltage is greater than or approximately equal to a highest intermediate voltage including the voltage across at least one capacitor in the valley-fill circuit, energy is supplied from the source to the inductor means and to the valley-fill circuit. Energy is then supplied to the converter from the source via the inductor means and in parallel from all capacitors (C1, C2) that have said highest intermediate voltage, wherein the amount of source energy supplied is dependent on the voltage ($V_{C3}$) across the input of the converter.

21 Claims, 3 Drawing Sheets

DEVICE AND METHOD OF SUPPLYING ENERGY FROM AN AC SOURCE IN AN AC TO DC CONVERTER

FIELD OF INVENTION

The present invention relates to the field of voltage converters and more particularly to the field of converting alternating voltage to a continuous voltage or direct current voltage. More specifically, the invention relates to an arrangement and to a method for measuring minimum input voltage, the transformer TR1 is supplied with current mainly by the capacitors in the two valley-fill circuits 12, 14.

DESCRIPTION OF THE PRIOR ART

IEC 1000-3-2 is a standard which discloses what appearance the voltage input and current input to an arrangement from an alternating voltage source shall have in order to be classed as a class A-type apparatus. One such arrangement is described in DE-A-4 243 943, among other things. The arrangement described in this publication includes a capacitor which is charged during that time period in which the absolute value of the source voltage exceeds the voltage across the capacitor, and is discharged when the absolute value of the source voltage is below this voltage. Another arrangement which fulfils the requirement of the aforesaid standard is described in the article "A New Family of Single-Stage Isolated Power-Factor Correctors with Fast Regulation of the Output Voltage", by R. Redl, L. Balogh and N.O. Sokal in PESC 94, Record, pages 1137–1144. This document is concerned mainly with how two switches can be combined to form one switch. The document discloses a plurality of different converter circuits. One of these circuits is a voltage converter that includes a rectifier bridge whose one output -terminal is connected to a coil which, in turn, is connected to a valley-fill circuit. The valley-fill circuit is connected to a fly-back converter which includes three windings. A controllable switch is connected between the other output terminal of the rectifier bridge and the interconnection junction between the coil and the valley-fill circuit. This circuit functions to charge the source voltage up to the two capacitors when the switch is switched-off. When the switch is made, one end of the coil is earthed and the entire voltage content of the source at that moment in time is applied across the coil. The two capacitors are discharged simultaneously in parallel through their respective windings, so as to generate a voltage across the third winding, which is used to generate a d.c. voltage. The coil is driven in this circuit in a discontinuous conducting mode (DCM), in other words it delivers all of its stored energy to the two capacitors. If the coil works in a continuous conducting mode (CCM) and the converter is connected to a load which draws only a small amount of current, the capacitors would not be discharged at the same rate as they are charged through the coil. This results in an elevated voltage across the capacitors, which in turn influences the pulsewidth that controls the switch. The voltage across the capacitors can then become so great as to require unnecessarily large and powerful capacitors, or the provision of several capacitors. Alternatively, a high voltage protector may be required to limit this voltage. These measures render the circuit relatively expensive. The problem can also be rectified by using a further control loop, although this solution requires a further controlled switch which, in turn, requires a different control than the first switch. This also adds to the cost of the arrangement.

SUMMARY OF THE INVENTION

The present invention solves the problem by virtue of the fact that in a converter which includes a transformer at least one inductor means and at least one valley-fill circuit obtain a high power factor and good functioning in a continuous conducting mode at low load while, at the same time, fulfilling the requirement concerning the appearance of the input voltage and input current from an a.c. voltage source to an arrangement in accordance with the standard IEC 1000-3-2.

The problem is solved by connecting a controlled switch means in the same current loop as the primary winding of the transformer, so that energy delivered to the primary winding will not arrive solely from the valley-fill circuit but also from said source via the inductor means. This enables the voltage level to which capacitors included in the valley-fill circuit are charged to be controlled in a manner such as not to be excessively high at low loads and in continuous conducting modes.

The object of the present invention is to provide an arrangement and method for supplying energy from an a.c. voltage source that provides high power factors and which fulfils the requirement of input voltage and input current appearance in accordance with the standard IEC 1000-3-2, and which will function well in a continuous conducting mode and at low loads.

One such inventive arrangement includes at least one inductor means connected between a rectifier bridge and a first valley-fill circuit, and a converter. The converter includes a transformer which has a primary winding connected in a loop that extends from an output terminal on the rectifier bridge to the interconnection junction of the inductor means and the valley-fill circuit. This loop also includes a controllable switch means.

According to the invention, one such method of supplying energy to a converter that includes a transformer having a primary winding comprises a number of steps when the absolute value of the source voltage is greater than or substantially equal to a highest intermediate voltage. During a positive half period of the source, the intermediate voltage includes the voltage across at least one first capacitor in a first capacitive series circuit. The first capacitor is also included in a first valley-fill circuit that includes at least two capacitors. Each such capacitor in the first valley-fill circuit is also included in a corresponding capacitive series circuit. During the positive half period, the method includes the steps of a1) supplying source energy to at least one inductor means and optionally in series to at least the capacitors in the first valley-fill circuit; and d1) supplying energy to the primary winding from the source via the inductor means and, in dependence on the voltage across the primary winding, in parallel from all capacitive series-circuits where the highest intermediate voltage is obtained, so that the amount of energy supplied from the source is dependent on the voltage across the primary winding.

Another object of the invention is to provide such an arrangement and such a method which supplies the converter in a softer fashion, by which is meant generates fewer harmonics in the input current, and which supplies the converter with energy more effectively.

This arrangement also includes a third capacitor which is connected in parallel with the earlier mentioned loop.

In this method, step a1) includes also supplying source energy to a third capacitor that does not form part of a valley-fill circuit, and when the voltage across the third capacitor is greater than the highest intermediate voltage, said further step b1) includes supplying energy to the primary winding from the third capacitor and from said source via said inductor means until the voltage across the third capacitor has fallen to the highest intermediate voltage. The step d1) then also includes supplying energy from capacitive series-circuits in parallel with the supply of energy from the third capacitor.

Another object of the invention is to provide an arrangement which is able to function in accordance with earlier mentioned principles and to deliver to the converter essentially the same voltage from two mutually different a.c. voltage sources when one source has voltage levels that are roughly half as great as the voltage levels of the other source.

This object is achieved with an inventive arrangement that has a second inductor means connected between the other output terminal of the rectifier bridge and the loop, at least one second valley-fill circuit connected between a second terminal on the first valley-fill circuit and the interconnection junction between the loop and the second inductor means, and a further switch means connected between an input terminal on the rectifier bridge and the interconnection junction between two of the valley-fill circuits.

The present invention affords the advantage that the voltage across the valley-fill circuit included in the inventive arrangement are controlled by the current through a first and optionally a second inductor means, so that said voltage is unable to surge at low load and in a continuous operating mode.

Another advantage is that the transformer included in the inventive arrangement has only two windings and that no high voltage protector or additional capacitors for overdimensioning the circuit are required, which provides an inexpensive arrangement when the arrangement shall be capable of being operated in a continuous conducting mode at low loads.

The term valley-fill circuit is intended to signify a plurality of capacitors that are connected together in a manner such that all capacitors will be charged in series with one another but discharged in parallel when the voltage across each of the capacitors is the same. By capacitive series-circuit is meant a circuit comprising capacitors where each capacitor is included in a respective valley-fill circuit. The capacitive series-circuit may include only one capacitor or may include several capacitors. By highest intermediate voltage is meant the voltage across a capacitor or across all capacitors in a capacitive series-circuit that is higher than or equal to a corresponding voltage for other capacitive series-circuits.

BRIEF DESCRIPTION OF THE DRAWINGS

The present invention will now be described in more detail with reference to the accompanying drawings, in which.

DESCRIPTION OF PREFERRED EMBODIMENTS

Figure 1:
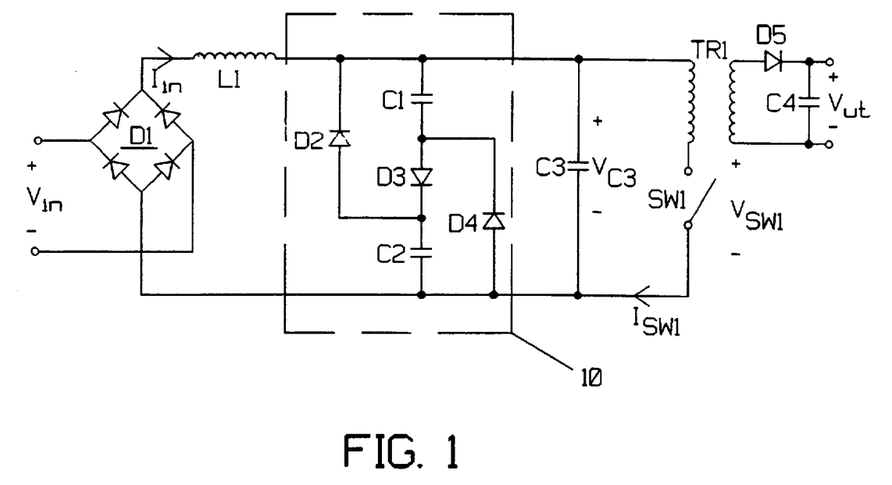
FIG. 1 is a circuit diagram illustrating a first embodiment of an inventive arrangement.

FIG. 1 illustrates a first embodiment of an inventive arrangement. The arrangement includes a rectifier bridge D1 whose two input terminals are intended to be connected to an a.c. voltage source so as to obtain an input voltage Vin. One output terminal of the bridge D1 is connected to a first terminal on a valley-fill circuit 10 via an inductor means L1, and the other output terminal is connected to a second connection terminal on the valley-fill circuit 10. The inductor means L1, also called pump choke, is preferably in the form of a coil and the valley-fill circuit or corresponding charging and discharging circuit includes capacitors that are charged in series and discharged in parallel. In this embodiment, the valley-fill circuit 10 includes a first capacitor C1 which is connected to a second capacitor C2 via a first diode D3. The first capacitor C1 is connected to the first connection terminal of the valley-fill circuit 10, and the second capacitor C2 is connected to the second connection terminal of said circuit. A second diode D2 is connected between the first connection terminal of the valley-fill circuit 10 and the interconnection junction between the first diode D3 and the second capacitor C2, and a third diode D4 is connected between the second connection terminal of the valley-fill circuit 10 and the interconnection junction between the first capacitor C1 and the first diode D3. The circuit diodes are turned such that when the sum of the absolute value of a voltage across the input terminals of the rectifier bridge D1 and the voltage across the inductor means L1 is greater than the voltage across the first capacitor C1 added to the second capacitor C2, the two capacitors will be connected in series, whereas when this voltage is lower than the voltage across respective capacitors C1 and C2, said two capacitors will be connected in parallel.

A third capacitor C3 is connected between the two connection terminals of the valley-fill circuit 10, and a loop is connected in parallel with said third capacitor C3. The loop includes a primary winding of a transformer TR1 and a controllable switch means SW1. The controllable switch means SW1 is preferably some kind of PWM-controlled transistor. The transformer TR1 has a secondary winding across whose connection terminals a fourth diode D5 is connected in series with a fourth capacitor C4. The transformer TR1, the fourth diode D5 and the fourth capacitor C4 together form a fly-back type converter. When the arrangement is connected to an a.c. voltage source, a voltage $V_{in}$ is obtained across the input terminals of the rectifier bridge D1. When the voltage $V_{in}$ is as large as that mentioned in connection with the diodes D2, D3 and D4 in the valley-fill circuit 10, the voltage will give rise to an input current $I_{in}$ to the arrangement, this current being indicated with an arrow between the rectifier bridge D1 and the inductor means L1. The input current $I_{in}$ is delivered mainly to the first capacitor C1 and to the second capacitor C2 and is also used to supply the converter TR1, D5 and C4 together with current from the aforesaid capacitors, so as to obtain a d.c. voltage $V_{out}$ across the fourth capacitor C4, this capacitor being used to supply current to a load connected to the inventive arrangement. The voltage $V_{C3}$ across the third capacitor C3 and the current $I_{SW1}$ passing through the controlled switched means SW1 and the voltage $V_{SW1}$ across said controlled switched means are also shown in FIG. 1. These magnitudes will be described in more detail below together with the function of the arrangement.

Figure 2A:
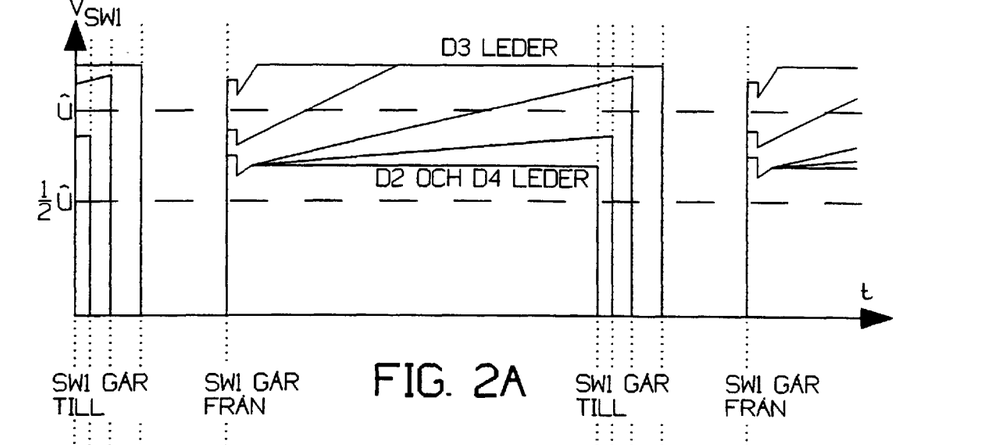
FIG. 2A shows curves which illustrate the time variation of the voltage across a controllable switch means in the arrangement of FIG. 1 at the switching frequency of said switch means.

FIG. 2A shows the voltage $V_{SW1}$ across the controlled switch means SW1 in dependence on the time t for a number of input voltages of mutually different magnitudes at constant frequency on the converter. Two voltage levels are shown in broken lines in the Figure, the maximum input voltage Û being shown uppermost and half the maximum input voltage ½ Û lowermost. The Figure illustrates the result of switching the switch means SW1 on and off. When the switch means is switched on, the voltage is 0 V and a relatively high voltage lies across the switch means when the switch means is switched off. It will be seen from the Figure that because of the PMW-control the time during which the switch means is current conducting will vary with the voltage $V_{SW1}$ across the switch means. The voltage $V_{SW1}$ across the switch means SW1 when said switch is switched-off is, at times, much greater than the maximum input voltage Û due to the addition of a voltage contribution as a result of mirroring of the output voltage from the fly-back converter. When the switch is switched-off, the voltage first increases momentarily to a value immediately above the half-maximum output voltage ½ Û of the voltage source and then rises linearly with time in the case of certain curves. This linear voltage increase is a consequence of the discharge of the third capacitor C3, as described in more detail below.

Figure 2B:
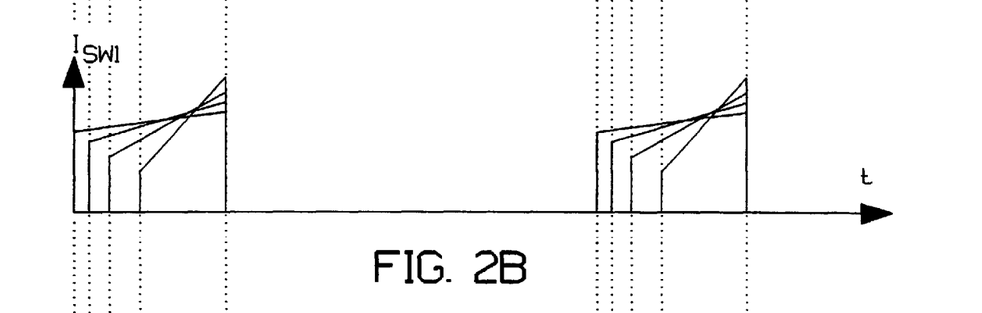
FIG. 2B shows curves which illustrate the time variation of currents corresponding to the voltages in FIG. 2A.

FIG. 2B shows corresponding currents $I_{SW1}$ through the controlled switch means SW1 for the different switch conducting times in dependence on the time t. The controlled switch means SW1 conducts only when switched-on and the energy transmitted to the converter through each current pulse is essentially of the same magnitude in each period.

Figure 2C:
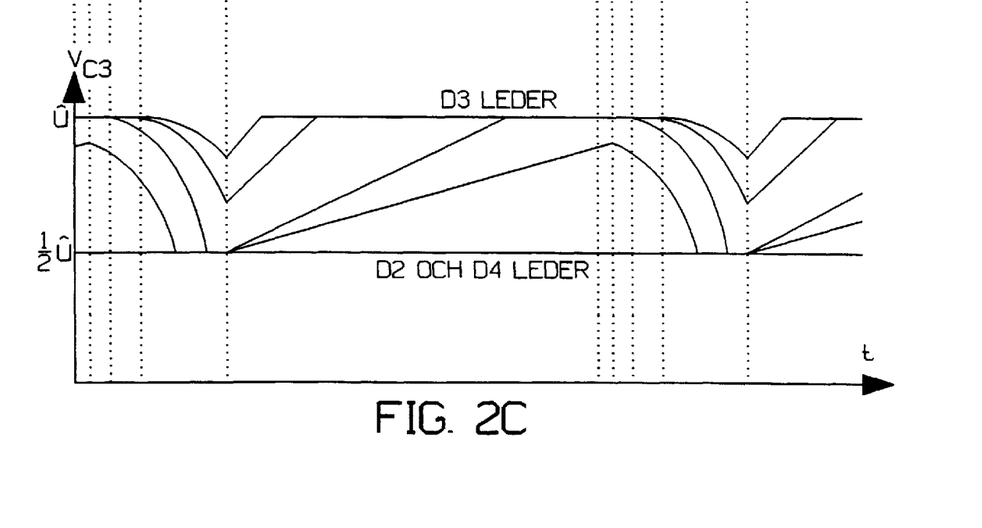
FIG. 2C shows curves illustrating the time variation of the voltage across a third capacitor shown in FIG. 1, these curves corresponding to the curve shown in FIGS. 2A and 2B.

FIG. 2C shows the voltage $V_{C3}$ across the third capacitor C3 in dependence on the time t. The Figure shows the maximum value of this voltage as varying between the half maximum voltage ½ Û of the source and its maximum voltage Û, although the voltage may, in reality, rise slightly above this latter voltage due to energy stored in the first inductor means L1. In addition to the higher levels in FIG. 2A resulting from the mirror contribution, the voltage curves in FIGS. 2A and 2C also differ by virtue of the fact that the voltage $V_{C3}$ across the third capacitor C3 will fall slowly towards the half maximum input voltage ½ Û when the switch means SW1 is current conductive, whereas the voltage across the switch means SW1 falls immediately to 0 V.

All curves show different time intervals relating to switching the controlled switch means SW1 on and off, these time points also being shown in broken vertical lines that pass through all Figures. The time interval shown in the Figure is much shorter than the period time of the voltage source. Consequently, a number of different voltage and current curves have been shown in order to indicate how variations occur at some different instantaneous input voltage values.

Figure 3A:
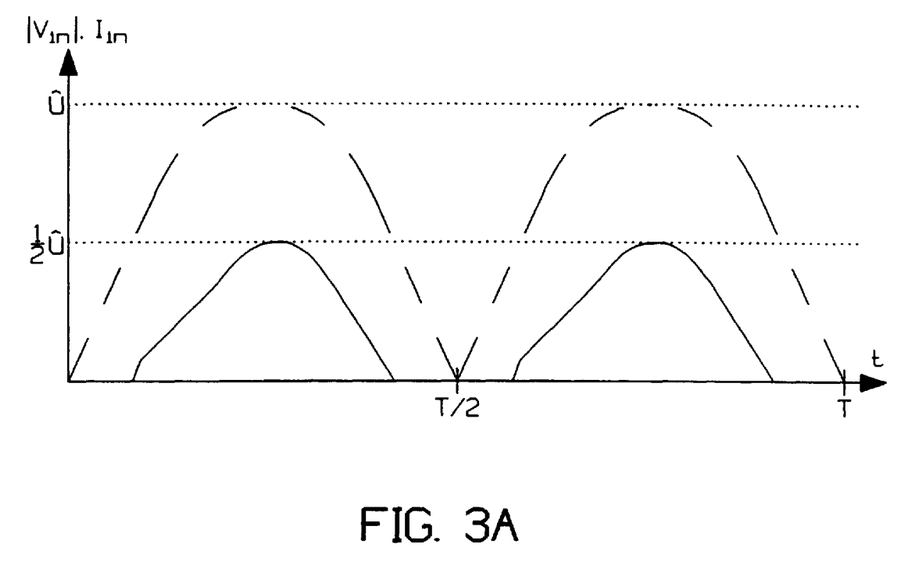
FIG. 3A shows curves illustrating the time variation of a fullwave rectified input voltage and input current from an a.c. voltage source to the arrangement in FIG. 1 at the source frequency.
Figure 3B:
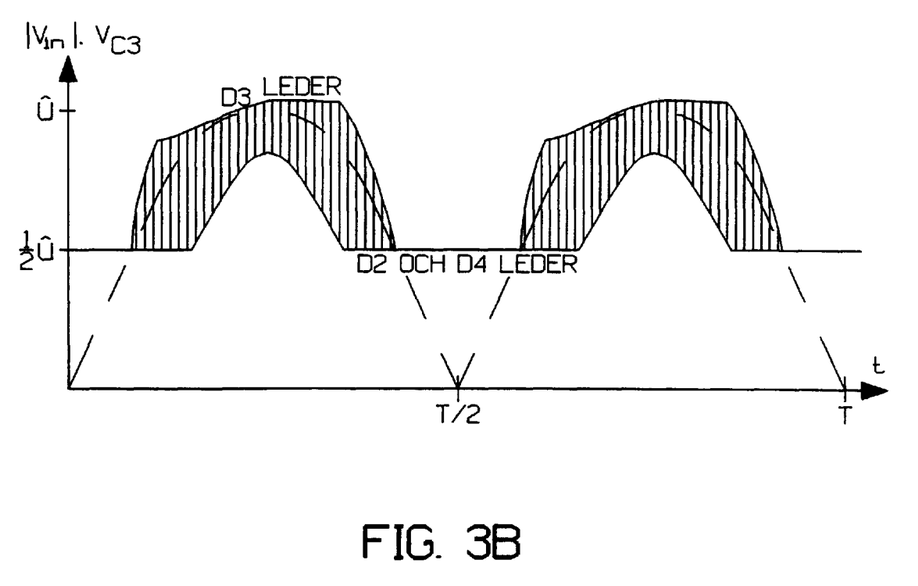
FIG. 3B shows curves illustrating the time variation of a fullwave rectified input voltage from the source and the voltage across the third capacitor shown in FIG. 1 at the source frequency.

FIG. 3A illustrates the time variation of the absolute value of the input voltage $|V_{in}|$ and the input current $I_{in}$ from the a.c. voltage source. This absolute value is, of course, the same voltage value obtained across the output terminals of the rectifier bridge. The absolute value of the input voltage has been shown with a broken line curve and the absolute value of the input current with a full line curve. The current drain is relatively broad, resulting in a high power factor, which is about 0.92 in the present context. The Figure also shows the levels of the maximum source voltage Û, and half its maximum voltage ½ Û in dotted lines. FIG. 3B shows the same absolute value of the input voltage and the voltage across the third capacitor $V_{C3}$ in dependence on time. Distinct from FIG. 2, FIG. 3 shows the time variation of the voltage $V_{C3}$ across the third capacitor C3 in the frequency interval of the voltage source, i.e. a period T of the source voltage is shown, wherein the voltage variation shown in FIG. 2C are shown in FIG. 3B as vertical dashes. All of the curves shown in FIGS. 2 and 3 relate to one and the same load connected to the arrangement.

The function of the arrangement illustrated in FIG. 1 will now be described with reference to FIGS. 2 and 3.

The first and second capacitors C1 and C2 shown in FIG. 1 have both the same capacitance and are much larger than the capacitor C3, the capacitance of this latter capacitor being about one-thousand times smaller than the first and second capacitors, for instance. Assuming that the arrangement works in a stationary mode; in other words, that the first and second capacitor C1 and C2 have each been charged to about half the maximum voltage of the source, the arrangement will operate in accordance with the following mutually sequential steps:

a1) When the absolute value of the source voltage $|V_{in}|$ is greater than half the maximum source voltage ½ Û and the switch means SW1 is switched-off, the source will deliver current to the arrangement. The third capacitor C3 and possibly the first and the second capacitor C1 and C2 are herewith charged with energy directly from the source and also with energy that has earlier been stored in the first inductor means L1. When the absolute value of the source voltage $|V_{in}|$ is sufficiently high so that when added to the voltage across the inductor means L1, the combined voltage will be greater than the voltage across the first and the second capacitor C1 and C2, the third capacitor C3 will be charged to this voltage level and the first diode D3 also becomes conductive so as to charge the first and the second capacitor C1 and C2, as shown in the three uppermost voltage curves in FIG. 2C. When the absolute value of the input voltage $|V_{in}|$ is located between half the maximum input voltage ½ Û and the maximum input voltage Û, the first and the second capacitors C1 and C2 will be disengaged and solely the third capacitor C3 charged, as shown in the next lowermost voltage curve in FIG. 2C.

a2) When the switch means SW1 is then switched on, the transformer TR1 draws current which, initially, arrives from the source via the first inductor means L1 and the third capacitor C3. The voltage $V_{C3}$ across the third capacitor C3 is therewith lowered. If this voltage $V_{C3}$ is kept sufficiently high, i.e. is unable to fall to the half maximum input voltage ½ Û, energy is delivered to the transformer TR1, and thus also to the converter, solely by the source via the inductor means L1 and the third capacitor C3, as indicated by the two uppermost voltage curves in FIG. 2C.

b) on the other hand, if the voltage $V_{V3}$ falls to about half the maximum source voltage ½ Û before the state of the switch means SW1 is again changed, shown in the second and third curves in FIG. 2C, the second and the third diode D2 and D4 will become conductive, and the first and the second capacitor C1 and C2 will also deliver current to the transformer TR1.

The amount of current required by the transformer will depend on the size of the load across the fourth capacitor C4 and the rate at which the voltage across the third capacitor C3 falls will therewith vary. A voltage corresponding to the difference between the absolute value of the source voltage $|V_{in}|$ and the voltage across the third capacitor $V_{C3}$ is applied across the first inductor means L1. The maximum value of this voltage is half the maximum source voltage ½ Û. As a result, energy is stored in the first inductor means L1 and this energy, or at least a part thereof, is later used to charge the three capacitors C1, C2 and C3. This energy will vary in accordance with the voltage across the third capacitor C3, i.e. the voltage across the converter input and will decrease the higher the voltage $V_{C3}$ across the capacitor C3 when the controlled switch means SW1 is switched off, said voltage $V_{C3}$ being, of course, dependent on the amount of current taken from the third capacitor C3. This prevents the voltage level to which the three capacitors C1, C2 and C3 are charged from surging.

When the instantaneous absolute value of the input voltage $|V_{in}|$ is lower than half the maximum input voltage ½ Û, no energy is delivered from the source, as will be evident from FIGS. 3A and 3B. The second and the third diodes D2 and D4 will then conduct constantly and the first and the second capacitors C1 and C2 are mutually connected in parallel during the whole of this switching period. When the controllable switch means SW1 is switched-on, the transformer TR1 will deliver energy from the third capacitor C3 and primarily in parallel from the first and the second capacitor C1 and C2. The voltage across the third capacitor C3 is maintained in this way at about half the maximum input voltage ½ Û, as evident from FIG. 3B and from the lowermost curve in FIG. 2C.

As will be seen from FIG. 3A, the appearance of the input current well satisfies the requirement according to standard IEC 1000-3-2.

As before mentioned, FIG. 3B illustrates voltage levels that correspond to those shown in FIG. 2B although in the source frequency interval. As will be evident from this Figure, the voltage $V_{C3}$ across the third capacitor C3 is essentially constant at half the maximum input voltage ½ Û when the input voltage is lower than this value, whereas the voltage $V_{C3}$ across the third capacitor C3 varies when the absolute value of the input voltage is greater than half the maximum input voltage ½ Û, from a lowermost value, initially with half maximum input voltage ½ Û, to an uppermost value which varies relatively slowly between the half maximum source voltage ½ Û and a voltage which is slightly greater than the maximum input voltage Û. The reasons why voltage levels that are higher than the maximum input voltage Û can be obtained is because the inductor means L1 pumps the voltage to a level above this level. The voltage $V_{C3}$ changes relatively quickly between these different values, as indicated with vertical dashes. The lowest voltage level has a hump in the middle of each half period T/2, i.e. the voltage level rises to a higher value than the half maximum input voltage. The aspect or appearance of this hump is dependent on the size of the third capacitor C3. Broader humps are obtained with greater values of C3, while a smaller hump is obtained with smaller values. The third capacitor C3 can be omitted in certain cases. No hump would then be obtained and the voltage would, instead, fall immediately to the half maximum input voltage ½ Û. The appearances, or aspects, of corresponding curves in FIG. 2C would also be different. The voltage that corresponds to the voltage $V_{C3}$ would fall almost immediately to half the maximum input voltage when switching on the switch means SW1.

In one conceivable variation of the inventive arrangement, the first and the second capacitor are not of mutually the same size but have different capacitances. In this way, one capacitor will begin to conduct before the other, due to the fact that different voltages are applied to the capacitors. This would correspond to a further step c1) between steps b1) and d1) in the earlier described method. This step c1) would then be such that when the voltage across the third capacitor falls to a highest intermediate voltage applied across, for instance, the first capacitor, said first capacitor would begin to conduct in parallel with the third capacitor until the voltage across the first capacitor (and across the third capacitor) falls to a voltage level applied across the second capacitor as a result of the first capacitor becoming conductive, whereafter the first, second and third capacitors supply the load in parallel.

Another variant is one in which the valley-fill circuit includes several capacitors which are charged in series and discharged in parallel. For instance, a valley-fill circuit in which three capacitors are charged in series and discharged in parallel is obtained when a first further diode is connected between the second capacitor C2 and the second connection terminal of the valley-fill circuit 10 in series with a further capacitor and when a second and a third further diode are connected from the first and the second connection terminal respectively of the valley-fill circuit 10 to the interconnection junction between the first further diode and the further capacitor and the interconnection junction between the second capacitor C2 and the first further diode respectively.

Naturally, a valley-fill circuit that includes still more capacitors can be obtained in a similar manner. However, when using three capacitors of mutually the same size, or having mutually the same capacitances, there is obtained an arrangement in which the voltage across the third capacitor C3 varies between the maximum voltage of the source and a third of the maximum voltage thereof, whereas when four capacitors are used there is obtained a voltage which varies between the maximum source voltage and a quarter of said maximum voltage, and so on.

Naturally, three or more capacitors of mutually different capacitances may be combined in the valley-fill circuit.

Furthermore, a further filtering capacitor may be placed over the two output terminals of the rectifier bridge in order to prevent ripple from reaching the source.

Figure 4:
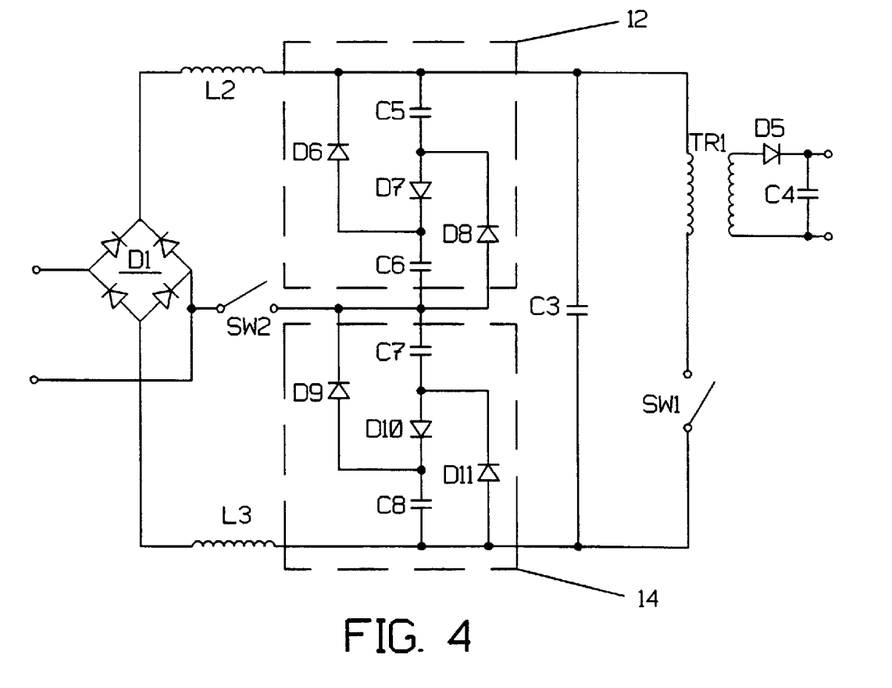
FIG. 4 is a circuit diagram illustrating a second embodiment of an inventive arrangement.

A further embodiment of the present invention is illustrated in FIG. 4. The arrangement is intended for use in both European and American electricity supply networks and delivers essentially the same current to the transformer TR1 in both instances. As with the FIG. 1 embodiment, this arrangement includes a rectifier bridge D1 to one output terminal of which there is connected a first connection terminal on a first valley-fill circuit 12 via a first inductor means L2. Similar to the valley-fill circuit 10 in FIG. 1, the valley-fill circuit 12 includes two capacitors C5 and C6 and three diodes D7, D6 and D8 which correspond respectively to the first and second capacitor C1 and C2 and to the first, second and third diodes D3, D2 and D4. There is connected to the second connection terminal of the first valley-fill circuit 12 the first connection terminal of a second valley-fill circuit 14, wherein said second valleyfill circuit 14 is similar to the first valley-fill circuit 12 and includes two capacitors C7 and C8 and three diodes D10, D9 and D11 which correspond respectively to the first and second capacitors C1 and C2 and to the first, second and third diodes D3, D2 and D4. A second connection terminal on the second valley-fill circuit 14 is connected to the second output terminal of the rectifier bridge D1 via a second inductor means L3. The two inductor means L2 and L3 may be wound on the same core. A third capacitor C3, which is much smaller than the capacitors included in the valley-fill circuits 12, 14 is connected between the first connection terminal on the first valley-fill circuit 12 and the second connection terminal on the second valley-fill circuit 14. A loop that includes a primary winding of a transformer TR1 and a controlled switch means SW1 is coupled in parallel with the third capacitor C3. Similar to the transformer in FIG. 1, the transformer TR1 includes a fly-back type converter which also includes a diode D5 and a capacitor C4. A second switch means SW2 is also connected between an input terminal on the rectifier bridge D1 and the interconnection junction between the first and the second valley-fill circuit 12 and 14 respectively.

The function of the arrangement shown in FIG. 4 will now be described. The second switch means SW2 is a manually operated switch which can be caused to change position, or states, when the arrangement shall be connected to a voltage source to which it has not earlier been set. When the arrangement is connected to the European electricity supply network, the second switch means SW2 is switched-off, whereas the switch means is switched-on when connected to the American electricity supply network.

The arrangement functions in the same manner as the arrangement described with reference to FIG. 1 when the second switch means SW2 is switched-off, wherein the first and the second valley-fill circuits 12 and 14 function as a single valley-fill circuit. All of the capacitors included in the valley-fill circuits are charged in series, although when the capacitors discharge the capacitors C8 and C7 in the second valley-fill circuit 14 discharge in parallel with one another but in series with the capacitors C5 and C6 in the first valley-fill circuit 12, these latter capacitors being discharged in parallel with one another, however. This can be viewed as though each capacitor in the first valley-fill circuit forms a capacitive series-circuit together with a corresponding capacitor in the second valley-fill circuit, wherein these capacitive series-circuits are discharged in parallel with one another in the same way as the capacitors in FIG. 1. When this view is applied to the first described embodiment, it can be said that the first embodiment included several capacitive series-circuits but each such capacitive series-circuit includes only one capacitor.

When the second switch means SW2 is switched-on, the arrangement operates in a slightly different manner. For instance, the first valley-fill circuit 12 is active during the first half-period and the second valley-fill circuit 14 is active during the second negative half-period of the source period. If it is the first valley-fill circuit 12 that is active in the stationary mode, the second valley-fill circuit 14 constantly delivers a voltage which is half the maximum input voltage. Each of the capacitors in the first valley-fill circuit 12 is charged to a voltage equal to half the maximum input voltage and when the input voltage reaches essentially its maximum value, these capacitors are charged and discharged when the input voltage is at half the maximum input voltage. There is then applied across the third capacitor C3 a voltage which varies in the same manner as that described with reference to FIGS. 2 and 3, although the relationship to the input voltage is different. The voltage varies between a highest voltage level corresponding to about 1.5 times the peak value of the input voltage and a voltage which is roughly equal to the peak value of the input voltage. When the input voltage is above half the maximum input voltage, the arrangement operates in accordance with the following step sequence:

a1) When the first switch means SW1 is switched-off, the third capacitor C3 and possibly the capacitors C5 and C6 in the first valley-fill circuit 12 is/are charged from the mains network via the two inductor means L2 and L3.

b1) When the first switch means SW1 is then switched-on, current is supplied to the transformer TR1 by the third capacitor C3 and by said source, via the inductors L2 and L3.

d1) When the voltage across the third capacitor C3 falls to a voltage which is roughly similar to the voltage across the capacitors in the first valley-fill circuit 12 plus the voltage across the capacitors in the second valley-fill circuit 14, the converter is supplied from the mains network, via the two inductor means L2 and L3, and also from the third capacitor C3 and from all capacitors in the two valley-fill circuits 10 and 12 in the manner described with reference to this arrangement with regard to discharging of the capacitors in the two valley-fill circuits when the second switch means SW2 is switched-off.

When the input voltage is less than half the maximum input voltage, but greater than zero volt, the transformer TR1 is supplied with current mainly from the capacitors in the two valley-fill circuits 12, 14.

When the input voltage is beneath 0 V and beneath half the minimum input voltage, the arrangement functions in accordance with the following step sequence:

a2) when the first switch means SW1 is switched off, the third capacitor C3 and possibly the capacitor C7 and CB in the second valley-fill circuit 14 is/are charged from the mains network via the two inductor means L2 and L3, b2) when the first switch means SW1 is then switched-on, the transformer TR1 is supplied with current by the third capacitor C3 and said source via the inductor means L2 and L3; and d2) when the voltage across the third capacitor C3 falls to a voltage which is approximately equal to the voltage across the capacitors in the first valley-fill circuit 12 plus the voltage across the capacitors in the second valley-fill circuit 14, the converter is supplied from the mains network, via the two inductors L2 and L3, from the third capacitor C3 and from the capacitors in the first and the second valley-fill circuit 10 and 12 in the manner described for this arrangement with reference to discharging the capacitors in the two valley-fill circuits when the second switch means SW2 is switched off.

When the input voltage is below 0 V and less than half the minimum input voltage, the transformer TR1 is supplied with current mainly by the capacitors in the two valley-fill circuits 12, 14.

The arrangement illustrated in FIG. 4 may, of course, be modified in the same way as that mentioned with reference to the FIG. 1 arrangement. However, if this embodiment uses HF ripple filtering capacitors, two capacitors are connected in series across the output terminals of the rectifier bridge D1, wherein the interconnection junction between these two capacitors is connected to the same input terminal on the rectifier bridge D1 as that to which the second switch means SW2 is connected. Furthermore, more than two valley-fill circuits can be connected between the output terminals of the rectifier bridge. It will be understood that the invention is not restricted to the use of fly-back type converters, and that other types of converters may alternatively be used, such as push-pull converters or forward converters.

A further variant of the FIG. 4 arrangement is one in which the second switch means SW2 and the leg of the rectifier bridge connected thereto are excluded, so that the interconnection junction between the two valley-fill circuits is connected directly to a pole on the a.c. voltage source.

It will be understood that this latter arrangement is not restricted to the American electricity supply network.

I claim:

1. An arrangement for supplying energy from an A.C. voltage source, comprising:
   a rectifier bridge and
   a converter, wherein a first inductor means is directly connected to a first output terminal on the rectifier bridge and the first inductor means is directly connected to a first connection terminal on a first valley-fill circuit that includes at least two capacitors adapted to be charged in series and discharged in parallel when the voltages across said capacitors are mutually the same;
   wherein the converter includes a transformer having a primary winding;
   wherein the primary winding is coupled in a loop that extends from a second output terminal on the rectifier bridge to the interconnection junction between the inductor means and the valley-fill circuit; and
   wherein the loop also includes a controllable switch means.

2. An arrangement according to claim 1, wherein a third capacitor is connected in parallel with said loop.

3. An arrangement according to claim 1, further comprising:
   a second inductor means connected between said second output terminal of the rectifier bridge and said loop;
   a second valley-fill circuit connected between a second connection terminal on the first valley-fill circuit and the interconnection junction between said loop and said second inductor means; and
   a further switch means connected between an input terminal on the rectifier bridge and the interconnection junction between two of the valley-fill circuits.

4. An arrangement according to claim 1, wherein the valley-fill circuit includes a series circuit that extends between two connection terminals on the valley-fill circuit and which includes at least a first and a second capacitor which are mutually connected via a first diode,
   wherein the valley-fill circuit also includes at least one second diode which is connected between the first connection terminal and the interconnection junction between the first diode and the second capacitor, and a third diode which is connected between a second connection terminal and the interconnection junction between the first capacitor and the first diode.

5. An arrangement according to claim 4, wherein the series circuit includes a third capacitor which is connected to the second capacitor via a further diode; and in that a fifth diode is connected between the first connection terminal and the interconnection junction between the fourth diode and the third capacitor.

6. A method of supplying energy from an A.C. voltage source to a primary winding of a transformer in a converter when the absolute value of the source voltage is greater than or approximately equal to a highest intermediate voltage which, when the source voltage has a positive half-period, includes the voltage across at least one first capacitor in a first capacitive series-circuit, wherein the first capacitor is also included in a first valley-fill circuit or corresponding charging and discharging circuit, wherein the first valley-fill circuit includes at least two capacitors, and each such capacitor is included in a corresponding capacitive series-circuit, and wherein the method comprises the steps of:
   a1) supplying energy from the source to at least one inductor means and in series to at least the capacitors in the first valley-fill circuit during said positive half-period;
   d1) supplying energy from the source via said inductor means directly to the primary winding during the positive half-period; and
   supplying energy directly to the primary winding in parallel from all capacitive series-circuits where said highest intermediate voltage is obtained, during said positive half-period and in dependence on the voltage across the primary winding of the transformer, so that the amount of source energy supplied is dependent on the voltage across the primary winding of the transformer.

7. A method according to claim 6, wherein step a1) includes supplying energy to said capacitors when the sum of the voltages across said capacitors is greater than the source voltage added to the voltage across said inductor means.

8. A method according to claim 6, further comprising the step of:
   b1) supplying to the primary winding energy from a capacitive series-circuit where said highest intermediate voltage is obtained when the voltage across the primary winding is essentially equal to the voltage across the whole of this capacitive series-circuit.

9. A method according to claim 6, wherein each capacitive series-circuit includes only one capacitor, wherein the method further comprises the step of:
   c1) supplying energy to the primary winding from the source via said inductor means and from the first capacitive series-circuit until the voltage across the first capacitor has fallen to a voltage level corresponding to the voltage level across at least one further of said capacitive series-circuits, this voltage level then being the new highest intermediate voltage, if during the first positive half-period only the first capacitive series-circuit has the highest intermediate voltage across itself.

10. A method according to claim 6, wherein step a1) includes supplying energy to a third capacitor which is not included in any valley-fill circuit, wherein the method further comprises the step of:
    b1) supplying energy to the primary winding from the third capacitor and from said source via said inductor means until the voltage across the third capacitor has fallen to the highest intermediate voltage, when the voltage across the third capacitor during the positive half-period is higher than the highest intermediate voltage
    wherein the step or steps in which energy is supplied from a capacitive series-circuit or from more than one capacitive series-circuit during the positive half-period also includes/include simultaneous parallel supply of energy from the third capacitor.

11. A method according to claim 6, wherein each capacitive series-circuit also includes a capacitor from a second valley-fill circuit, wherein said second valley-fill circuit includes at least two capacitors; and in that the highest intermediate voltage is comprised of the voltage across the first capacitor added to the voltage across a second capacitor, and wherein step a1) includes supplying current in series to the capacitors in the first and the second valley-fill circuit.

12. A method according to claim 11, further comprising the further step of:
    c1) supplying energy to the primary winding from said source via said inductor means and the first capacitive series-circuit until the voltage across the first capacitive series-circuit has fallen to a voltage level which corresponds to the voltage level across a further one of said capacitive series-circuits, if during the first positive half-period only the first capacitive series-circuit has the highest intermediate voltage,
    wherein the voltage level across the first capacitive series circuit becomes the new highest intermediate voltage.

13. A method according to claim 11, wherein step a1) supplying energy to a third capacitor which is not included in any valley-fill circuit; and further comprising step b1) in which when the voltage across the third capacitor during the positive half-period is greater than the highest intermediate voltage then energy is supplied to the primary winding from the third capacitor and from said source via said inductor means until the voltage across the third capacitor has fallen to the highest intermediate voltage and wherein the step or steps in which energy is supplied from capacitive series-circuits includes/include simultaneous parallel supply of energy from the third capacitor.

14. A method according to claim 6, wherein during a second negative half-period of the source voltage, the highest intermediate voltage is determined across the same capacitor or capacitors as that capacitor or those capacitors during the positive half-period and all steps are carried out in mutually the same way during the negative half-period and during the positive half-period.

15. A method according to claim 6, wherein the highest intermediate voltage during a positive half-period is comprised of the voltage across the first capacitor;

wherein each capacitive series-circuit includes a capacitor from the first valley-fill circuit and a capacitor from a second valley-fill circuit;

wherein when the source voltage has a negative half-period, the highest intermediate voltage is comprised of the voltage across at least one second capacitor in a second valley-fill circuit that includes at least two capacitors, wherein the second capacitor is included in the first capacitive series-circuit; and wherein during the negative half-period the method further comprises the steps of:

a2) supplying source energy to at least one inductor means and in series to the capacitors in the second valley-fill circuit; and d2) supplying energy to the primary winding from the source via said inductor means and in dependence on the voltage across the primary winding of the transformer in parallel from all capactive series-circuits in which said highest intermediate voltage is obtained, so that the amount of energy supplied from the source is dependent on the voltage across the primary winding of the transformer.

16. A method according to claim 15, wherein the method further comprises the step of:

a2) supplying energy to said capacitors in the second valley-fill circuit when the absolute value of the sum of the voltages across these capacitors is greater than the absolute value of the source voltage added to the voltage across said inductor means.

17. A method according to claim 15, wherein the method further comprises the step of:

b2) supplying energy to the primary winding from a capacitive series-circuit in which said highest intermediate voltage is obtained when the voltage across the primary winding is essentially equal to the voltage across the whole of this capacitive series-circuit.

18. A method according to claim 15, further comprising the step of:

c2) supplying energy, when only one second capacitor has the highest intermediate voltage during the negative half-period, to the primary winding from the source via said inductor means and from the first capacitive series-circuit until the voltage across the second capacitor has fallen to a voltage level which corresponds to at least one other of said capacitors in the second valley-fill circuit, this voltage level then becoming the new highest intermediate voltage.

19. A method according to claim 15, further comprising the steps of:

a2) supplying energy to a third capacitor which is not included in any valley-fill circuit; and b2) supplying energy, when the voltage across the third capacitor during the negative half-period is greater than the voltage across the whole of the first capacitive series-circuit, to the primary winding from the third capacitor and from said source via said inductor means until the voltage across the third capacitor has fallen to the level of the voltage across the first capacitive series-circuit, wherein the step or steps in which energy is supplied from one or, more capacitive series-circuits during the negative half-period includes/include simultaneous parallel supply of energy from the third capacitor.

20. An arrangement for supplying energy from an A.C. voltage source comprising:

a rectifier bridge; and a converter;

wherein a first inductor means is directly connected to a first output terminal on the rectifier bridge and the first inductor means is directly connected to a first connection terminal on a first valley-fill circuit that includes at least two capacitors which are adapted to be charged in series and discharged in parallel;

wherein the converter includes a transformer having a primary winding connected in a loop that extends from a second of the output terminals on the rectifier bridge to the interconnection junction between the inductor means and the valley-fill circuit, and wherein the loop also includes a controllable switch means.

21. A method of supplying energy from an A.C. voltage source to a primary winding of a transformer in a converter when the absolute value of the source voltage is greater than or approximately equal to a highest intermediate voltage which, when the source voltage has a positive half-period, includes the voltage across at least one first capacitor in a first capacitive series-circuit, wherein the first capacitor is also included in a first valley-fill circuit, wherein the first valley-fill circuit includes at least two capacitors, and wherein each such capacitor is included in a corresponding capacitive series-circuit, said method comprising the steps of:

a1) supplying energy from the source to at least one inductor means and in series, to at least the capacitors in the first valley-fill circuit during said positive half-period; and d1) supplying energy from the source via said inductor means directly to the primary winding during the same positive half-period; and supplying energy directly to the primary winding in parallel from all capacitive series-circuits that have said highest intermediate voltage in dependence on the voltage across the primary winding of the transformer, so that the amount of source energy supplied is dependent on the voltage across the primary winding of the transformer.

* * * * *